US008638834B2

(12) United States Patent
Hedayat et al.

(10) Patent No.: US 8,638,834 B2
(45) Date of Patent: Jan. 28, 2014

(54) SIGNAL SEQUENCE DETECTION TECHNIQUES FOR OFDM/OFDMA SYSTEMS

(75) Inventors: Ahmadreza Hedayat, Allen, TX (US); Mohammad Janani, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1063 days.

(21) Appl. No.: 12/503,277

(22) Filed: Jul. 15, 2009

(65) Prior Publication Data
US 2011/0013708 A1      Jan. 20, 2011

(51) Int. Cl.
*H04B 1/00* (2006.01)
*H04B 7/212* (2006.01)
*H04B 15/00* (2006.01)

(52) U.S. Cl.
USPC .......................... 375/146; 370/324; 455/502

(58) Field of Classification Search
USPC .................................. 375/130, 146; 370/324
See application file for complete search history.

(56) References Cited

U.S. PATENT DOCUMENTS

| | | | | |
|---|---|---|---|---|
| 5,694,389 A * | 12/1997 | Seki et al. | ...................... | 370/208 |
| 6,771,976 B1 * | 8/2004 | Koyama | ........................ | 455/502 |
| 2002/0009127 A1 * | 1/2002 | Misra et al. | ................... | 375/146 |
| 2003/0072255 A1 * | 4/2003 | Ma et al. | ....................... | 370/208 |
| 2004/0090929 A1 | 5/2004 | Laux et al. | | |
| 2004/0114552 A1 * | 6/2004 | Lim et al. | ...................... | 370/324 |
| 2004/0179625 A1 * | 9/2004 | Kim | ............................. | 375/260 |
| 2005/0094550 A1 * | 5/2005 | Huh et al. | ..................... | 370/203 |
| 2005/0195885 A1 * | 9/2005 | Misra et al. | ................... | 375/130 |
| 2007/0098050 A1 * | 5/2007 | Khandekar et al. | ............ | 375/146 |
| 2007/0110185 A1 * | 5/2007 | Kroeger et al. | ............... | 375/320 |
| 2008/0079633 A1 * | 4/2008 | Pon et al. | .................. | 342/357.12 |

* cited by examiner

*Primary Examiner* — Leon-Viet Nguyen
*Assistant Examiner* — Sarah Hassan
(74) *Attorney, Agent, or Firm* — Edell, Shapiro & Finnan, LLC (57) ABSTRACT

Energy in a frequency band is received at a wireless communication device and data is generated representing samples of a received time domain waveform from the received energy. Data for groups of samples of the received time domain waveform is processed to transform the data for the received time domain waveform to produce data for an intermediate domain signal that is in neither the time domain nor the frequency domain. The data representing the intermediate domain signal is analyzed to determine whether a sequence having a predetermined pattern from a set of possible sequences is present in the received energy, and ultimately to determine a sequence of the predetermined pattern whose presence is detected in the received energy.

23 Claims, 9 Drawing Sheets

SIGNAL SEQUENCE DETECTION TECHNIQUES FOR OFDM/OFDMA SYSTEMS

TECHNICAL FIELD

The present disclosure relates to wireless communication devices and systems, and more particularly to detecting a signal with predetermined patterns in wireless transmissions.

BACKGROUND

In orthogonal frequency division multiplexed (OFDM) and orthogonal frequency division multiple access (OFDMA) systems, a remote client station achieves its synchronization status with respect to a base station by detecting and synchronizing to a training sequence, also known as a preamble. Usually appearing at the beginning of transmission frame, the preamble is a particular pseudo-noise (PN) sequence among a set of PN sequences known a priori to the client station.

In some OFDM-based broadband wireless technologies, preamble has some frequency or time properties that can facilitate its detection in a client station. For example, in the IEEE 802.16d/e standard, known commercially as WiMAX™, preamble occupies every third tone or subcarrier, leaving other tones unused. In the frequency domain, this property makes the representation of the preamble in the time domain have repetitive characteristics.

There is room for improving the efficiency of detecting the sequence of a wireless signal, whether a preamble sequence, ranging sequence, sounding sequence or other sequence having a predetermined pattern.

DESCRIPTION OF EXAMPLE EMBODIMENTS

Overview

Energy in a frequency band is received at a wireless communication device and data is generated representing samples of a received time domain waveform from the received energy. Data for groups of samples of the received time domain waveform is processed to transform the data for the received time domain waveform to produce data for an intermediate domain signal that is in neither the time domain nor the frequency domain. The data representing the intermediate domain signal is analyzed to determine whether a sequence having a predetermined pattern from a set of possible sequences is present in the received energy, and ultimately to determine a sequence of the predetermined pattern whose presence is detected in the received energy. The techniques described herein may be employed to detect the presence of a sequence having a predetermined pattern, such as a preamble sequence, a ranging signal sequence, a sounding signal sequence or any portion part of a wireless signal with structure similar to that of a preamble. Thus, while the foregoing description refers, in some cases, specifically to detecting a preamble pattern and a pseudo-noise preamble sequence, this is meant by way of example only.

Example Embodiments

Figure 1:
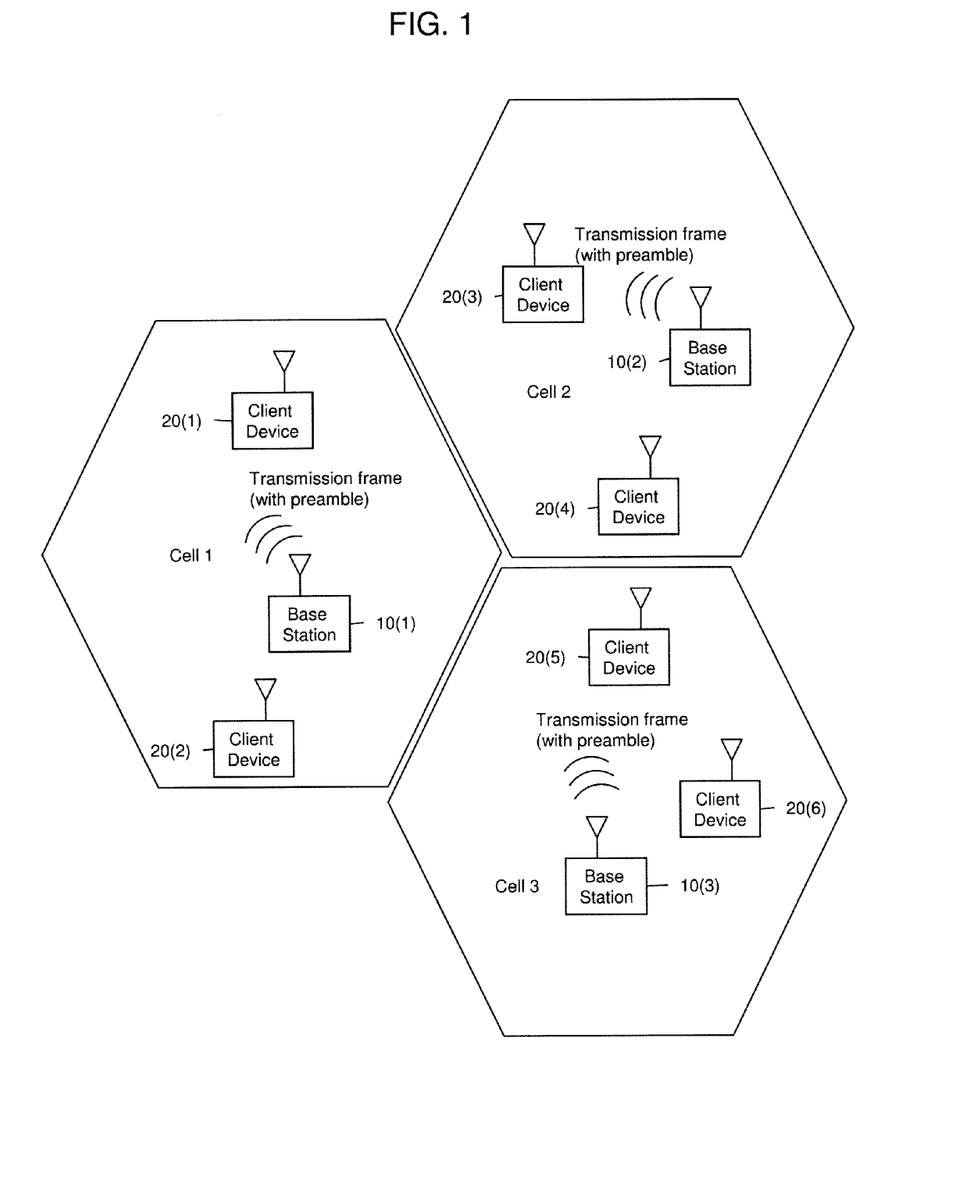
FIG. 1 is a block diagram of a wireless communication network in which wireless client devices are configured to detect a preamble in signals transmitted by base stations according to the techniques described herein.

Referring first to FIG. 1, a wireless communication network is shown at reference numeral 5. The network 5 is a multi-cell network comprising a plurality of wireless base stations, and in this example, three base stations 10(1), 10(2) and 10(3), each of which serves a corresponding cell or coverage area where client devices are located. For example, base station 10(1) serves Cell 1 where (in this simplified example) there are two client devices 20(1) and 20(2), base station 10(2) serves Cell 2 where there are two client devices 20(3) and 20(4) and base station 10(3) serves Cell 3 where there are two client devices 20(5) and 20(6). It should be understood that each base station may serve many more client devices in its coverage area. The base stations 10(1)-10(3) may serve as a gateway for client devices to another network, i.e., the Internet.

The base stations 10(1)-10(3) wirelessly transmit frames in their respective cells, and each frame includes a preamble portion that the client devices use to synchronize to the transmissions of the base station for a given cell. In the case of adjacent cells, such as that shown in FIG. 1, frequency reuse techniques are necessary to minimize inter-cellular interference. The preamble detection techniques described herein can be used for a variety of frequency reuse configurations, even a frequency reuse "one" (N=1) configuration.

Figure 2:
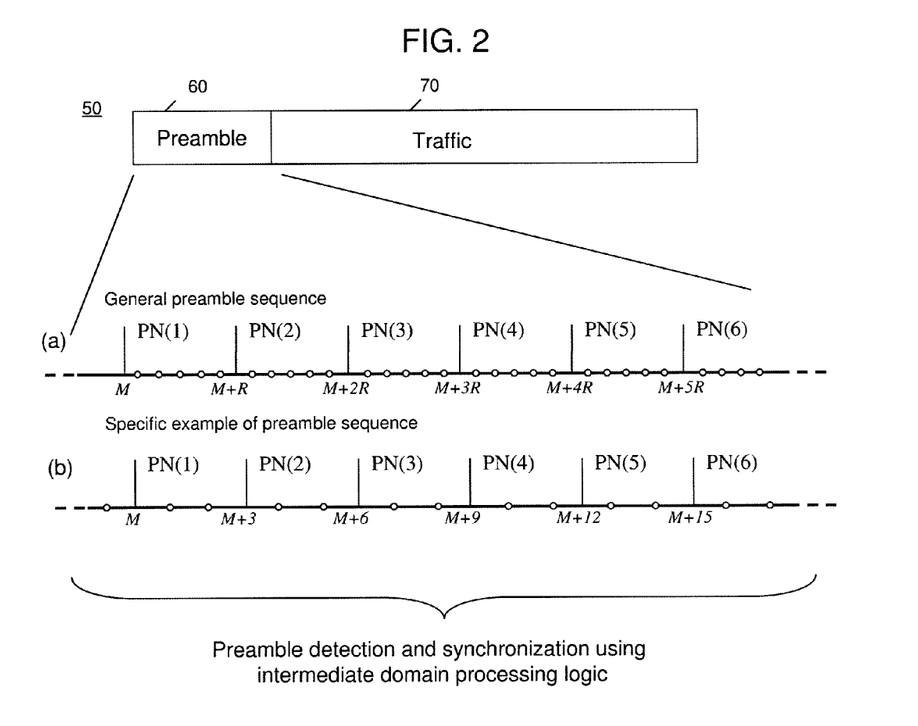
FIG. 2 is a diagram showing a transmission frame and examples of sequences detected according to the techniques described herein.

Turning now to FIG. 2, examples of preamble sequences are shown. FIG. 2 shows an example of a transmission frame 50 comprising a preamble field 60 and a traffic field 70. This is a generalized depiction of a transmission frame. FIG. 2 shows two preamble sequences for the preamble field 60. Preamble sequence (a) is a generalized preamble sequence whereas preamble sequence (b) is a specific example of the preamble sequence used in the WiMAX standard. If multiple base stations are deployed in an area (e.g., such as that shown in FIG. 1) and they may be using the same frequency band, each base station may be configured to transmit its preamble as shown by sequence (a) in FIG. 2. For example, one base station places its preamble at the indices M, M+R, M+2R, . . . , M+kR, . . . another base station places its preamble at the indices M+1, M+R+1, M+2R+1, . . . , M+kR+

1, ... and so on, where M is the margin. With such a structure, up to R base stations can place their preamble in the same frequency band without interfering each other. Two base stations may place their preambles on the same tones (subcarriers).

In the preamble sequence (b) shown in FIG. 2, the pseudo-noise (PN) code elements are placed every third tone, i.e., there are two tones with zero value between two consecutive placements of PN code elements. Thus, every third tone of the preamble OFDM signal is a bipolar bit of a PN sequence and the rest of the tones are unused: P(3n)=PN(n) and P(3n+1)=0, P(3n+2)=0, where P(.) is the preamble signal representation in the frequency domain whose size is the size of a Fast Fourier Transform (FFT) block. Some margins of the preamble signal might be left unused (i.e., with zero value in frequency domain) for other reasons which are not related to this topic.

The size of the FFT block used at the transmitting device, that is, the device that generates and sends the transmission with the predetermined pattern, is denoted as F. To generalize the underlying principles of the techniques described herein, the predetermined pattern (e.g., preamble pattern) is assumed to have a repetition rate of R in the frequency domain, which means there are R−1 unused tones between each two used tones in the frequency representation shown in FIG. 2. For now it is assumed that R divides F, but this is not a requirement and a more general case is explained hereinafter. The preamble signal in frequency domain is denoted P(.) and in time domain it is denoted by p(.), and the PN code by PN(.). The PN code is selected at the base station from a set of PN sequences. The client devices know the set of possible PN sequences from which the base station may choose, but they do not know the exact PN code used by the base station for any given transmission frame. The following relationship holds between p(.) and P(.) based on an FFT transform:

$$p(n) = \sum_{i=0}^{F-1} P(i)\exp\left(\frac{-j2\pi i n}{F}\right)$$

When the frequency domain structure of the preamble sequence P(.) is applied, the result is:

$$p(n) = \sum_{i=0}^{(F-1)/R} P(Ri)\exp\left(\frac{-j2\pi Rin}{F}\right)$$

The above relationship is obtained since only P(R×i) is nonzero and the rest are zero, that is, P(R×i+1)=0, P(R×i+2)=0, ..., P(R×i+R−1)=0 where i=0, ..., (F−1)/R. Examining other samples of the time domain preamble sequence that are separated by F/R samples, one can obtain:

$$p\left(n + \frac{F}{R}\right) = \sum_{i=0}^{(F-1)/R} P(Ri)\exp\left(\frac{-j2\pi Ri\left(n + \frac{F}{R}\right)}{F}\right)$$

$$= \sum_{i=0}^{(F-1)/R} P(Ri)\exp\left(\frac{-j2\pi Rin}{F} \times (-j2\pi i)\right)$$

$$= p(n)$$

In addition, the relationship is obtained where p(n)=p(n+F/R)=p(n+2F/R)= ..., indicating that due to the frequency domain structure of the preamble P(.) the time domain structure is repeated by period of F/R.

The non-zero elements of P(.) are located at R×i indices. It is possible that the non-zero elements are located at R×i+k, and preamble at indices R×i, R×i+1, ..., R×i+k−1, R×i+k+1, ..., R×i+R−1 (i.e. all others except the ones located at indices R×i+k) are zero. In these cases, the magnitudes of p(n), p(n+F/R), ..., p(n+(R−1)F/R) are the same but their phase could be different.

$$p(n) = \sum_{i=0}^{(F-1)/R} P(Ri+k)\exp\left(\frac{-j2\pi(Ri+k)n}{F}\right)$$

Examining the n+F/R'th sample of the time domain representation of the preamble:

$$p\left(n + \frac{F}{R}\right) = \sum_{i=0}^{(F-1)/R} P(Ri+k)\exp\left(\frac{-j2\pi(Ri+k)\left(n + \frac{F}{R}\right)}{F}\right) = p(n)e^{-j2\pi k/R},$$

it is the same as n'th sample, p(n), with a phase rotation. Similarly, $$p\left(n + \frac{2F}{R}\right) = p(n)\exp(-j4\pi k/R),$$

and more generally $$p\left(n + \frac{bF}{R}\right) = p(n)\exp(-j2\pi kb/R).$$

The equations explained above indicate that the specific structure of the preamble in the frequency domain causes a repetition-based structure of the preamble in the time domain. The repetition structure is in terms of an absolute-value of the time domain samples, and their phase varies based on the location of the non-zero elements of the frequency domain samples. This repetition structure facilitates the signal detection techniques described herein, and again these techniques may be used to detect preamble sequences as well as other sequences, such as ranging sequences, sounding sequences, etc. A "sequence" as used herein is meant to refer to a deterministic sequence of features of a signal, such as amplitude and/or phase.

Figure 3:
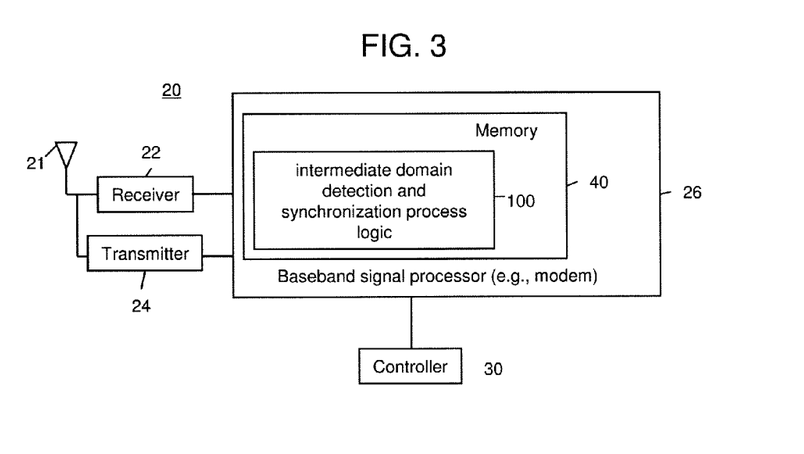
FIG. 3 is a block diagram of a wireless client device configured to detect a sequence pattern using intermediate domain detection and synchronization process logic.

Turning now to FIG. 3, an example of a block diagram of a wireless communication device, e.g., a client device, 20 is shown. The client device 20 comprises at least one antenna 21, a radio frequency (RF) receiver 22, an RF transmitter 24, a baseband signal processor or modem 26 and a controller 30. The receiver 22 downconverts received RF energy detected by the antenna 21 and produces a baseband receive signal. There are analog-to-digital converters (ADCs) between (or as part of either or both of) the receiver 22 and the modem 26 to convert the baseband receive signal to a digital signal for processing by the modem 26. Similarly, there are digital-to-analog converters (DACs) between (or as part of either or both of) the modem 26 and the transmitter 24 that convert a baseband transmit signal to an analog transmit signal for upconversion by the transmitter 24 and transmission via antenna 21.

The modem 26 may be implemented by a data processor, microprocessor, microcontroller, digital signal processor, application specific integrated circuit made up of digital logic gates, a programmable gate array device or other programmable or fixed logic device. Regardless of the specific implementation of the modem 26, it contains intermediate domain detection and synchronization process logic 100. To reiterate, the logic 100 may be embodied as logic encoded in one or more tangible media for execution and when executed, operable to perform functions described in further detail hereinafter. The logic 100 may be implemented in fixed or programmable digital logic gates or by software instructions stored in one or more memory media, e.g., memory 40 shown in FIG. 3, that when executed by a processor or computer, cause the processor or computer to perform the functions described herein.

The controller 30 is, for example, a data processor, e.g., a microprocessor or microcontroller, that performs higher level control functions for the client device 20. The logic 100 may be performed completely by the controller 30 or partly by the modem 26 and partly by the controller 30. The wireless client device 20 may wirelessly communicate with its base station using any wireless communication protocol, such as the WiMAX communication protocol. To this end, the modem 26 is configured to apply the appropriate modulation and packet format to a transmission and likewise to recover and demodulate a received transmission according to the rules of the communication protocol employed.

Figure 4:
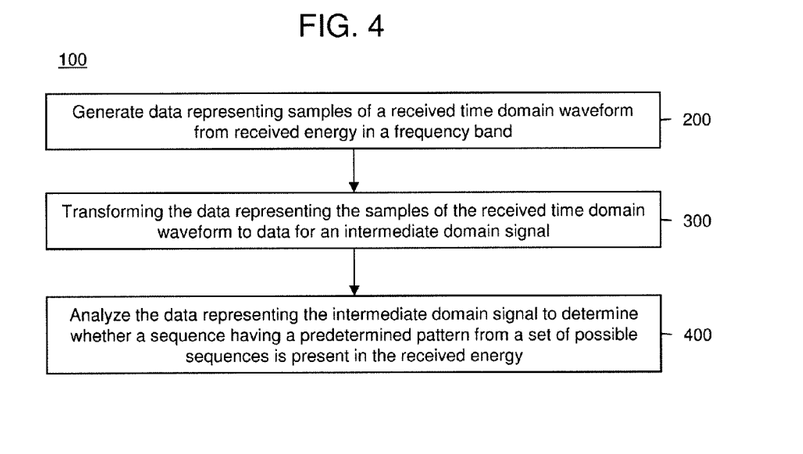
FIG. 4 is a flow chart generally depicting the intermediate domain detection and synchronization process logic.

Turning now to FIG. 4, a high level flow chart is shown for the process logic 100. Energy, e.g., RF energy, is received by the wireless communication device that executes the process logic 100. From the received energy, at 200, the device generates data representing samples of the received time domain waveform from the received energy. Next, at 300, data for groups of samples of the received time domain waveform are processed to transform the data representing the samples of the received time domain waveform to data for an intermediate domain signal. At 400, the data representing the intermediate domain signal is analyzed to determine whether a sequence having a predetermined pattern from a set of possible sequences is present in the received energy.

Figure 5:
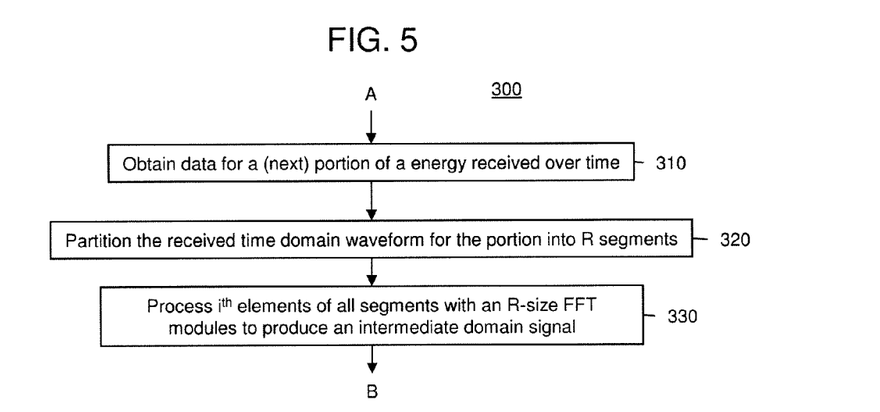
FIG. 5 is a flow chart depicting process logic for transforming a time domain waveform to an intermediate domain signal as part of the intermediate domain detection and synchronization process logic.

Turning to FIG. 5, the transforming function 300 is described in more detail. This transforming function is performed repeatedly for time segment portions of the energy received over time. For example, data representing samples of the received time domain waveform generated at function 200 in FIG. 4 is accumulated as energy is received over time. Smaller time slices or segments of this data is obtained and processed by the transforming function 300. These portions may or may not overlap as described further hereinafter. Thus, at 310, data for a time segment portion is obtained. The transforming function involves FFT processing of a group (also called segments herein) of samples of the received time domain waveform to produce the intermediate domain signal or sequence. However, other transforms may be used other than an FFT. For example, a digital Fourier transform (DFT), Z-transform, or any other practical transform with exponential-type coefficients may be employed in the transforming function 300.

At 320, for the data associated with the portion of energy obtained at 310, the samples of the received time domain waveform are partitioned into R plurality of segments or groups with each segment or group comprising a plurality of samples, wherein R is a repetition frequency of a predetermined pattern whose presence is to be recognized in the received energy. Next, at 330, corresponding $i^{th}$ elements of the plurality of segments are processed with a corresponding Fast Fourier Transfer (FFT) module of size R such that each FFT module outputs R complex values which across the plurality of FFT modules that make up the intermediate domain signal.

The term "intermediate domain" is meant to refer to or indicate that only part of the processing that is usually performed to transfer a sequence from one domain to another, e.g. from time domain to frequency domain, is performed. Hence the resulting intermediate time domain signal sequence is in neither the time domain nor the frequency domain. However, a sequence in the intermediate domain can be processed further to place it in the time domain or frequency domain if needed. Some predetermined patterns of a sequence are more easily detected in the intermediate domain.

Figure 6:
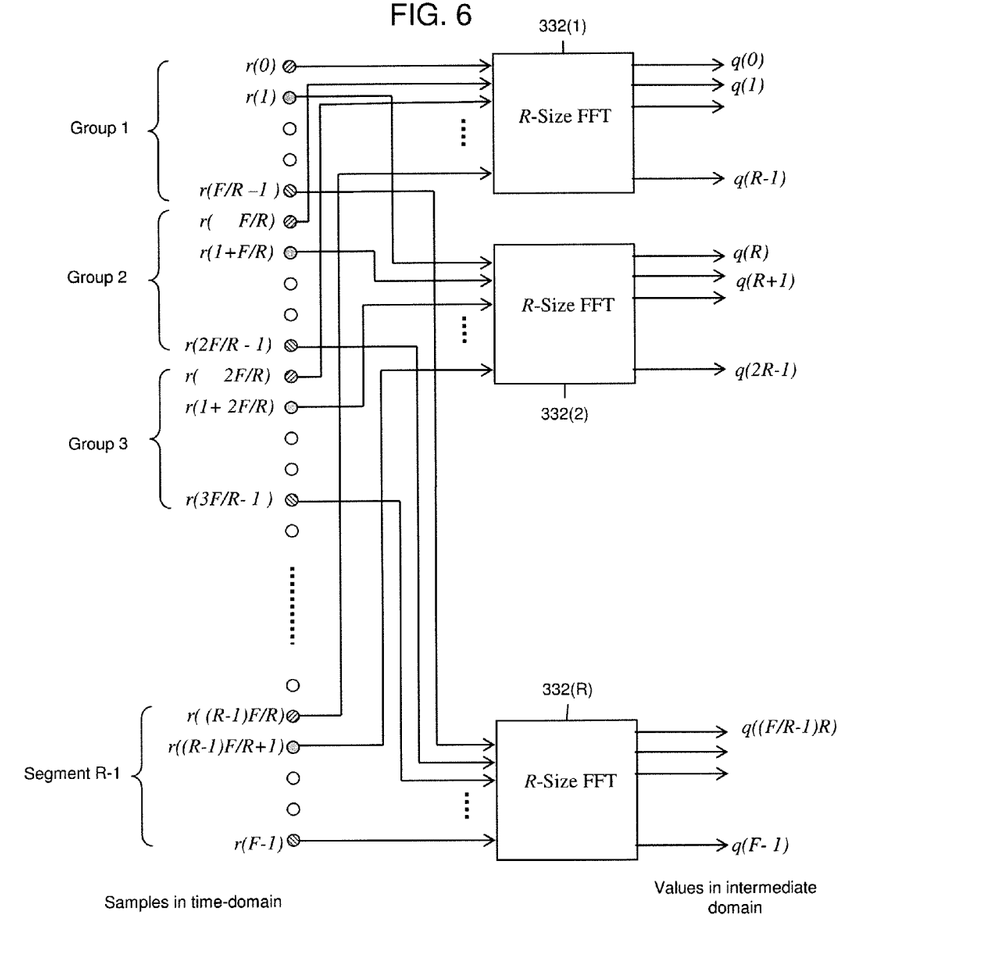
FIG. 6 is a block diagram illustrating an architecture for Fast Fourier Transform (FFT) processing of the time domain waveform to produce the intermediate domain signal.

The function 330 is described in further detail with reference to FIG. 6. FIG. 6 illustrates R plurality of FFT modules 332(1)-332(R), each of size R. These FFT modules may be implemented in the modem 26 (FIG. 3) with digital logic gates, in software or with digital signal processing instructions. The first sample elements of all the groups are processed by the first FFT module 332(1). The second elements of all the groups are processed similarly by FFT module 332(2) and so on, such that the last elements of all of the segments are processed by FFT module 332(R). In general the $i^{th}$ sample elements of all groups, whose total number is R, are processed with an FFT module with size R. Said another way, the time domain samples $r(n)$, $r(n+F/R)$, $r(n+2F/R)$, ..., $r(n+(R-1)F/R)$ are processed by an FFT module with size R. The output of each FFT module is denoted by $q(.)$, where $q(0), \ldots, q(R-1)$ is the output of the first FFT and $q(R), \ldots, q(2R-1)$ is the output of the second FFT and so on. Thus, corresponding $i^{th}$ elements of the plurality of segments are processed with a corresponding FFT module of size R such that each FFT module outputs R complex values which across the plurality of FFT modules 332(1)-332(R) make up the intermediate domain signal. As explained above, and in more detail hereinafter, the function 300 is repeated continuously for portions of the time domain signal received over time.

In general, the intermediate domain is actually an intermediate step in performing an F-size FFT over the time domain signal. For instance, if F=512 and R=4, an efficient software or hardware implementation of an FFT function is based on first transferring the time domain sequence to the intermediate domain by an FFT of size 4 (similar to that shown in FIG. 6). In the rest of the FFT processing, there may be other intermediate domains as well. For example, for F=512 and R=4, after performing the first FFT of size 4 as in FIG. 6, there are other similar stages that result in other intermediate domains. The first intermediate domain is considered herein and is by way of example only.

As explained above, transform computations other than an FFT may be employed. Thus, the FFT modules shown in FIG. 6 may be more generally referred to as transform modules.

Figure 7:
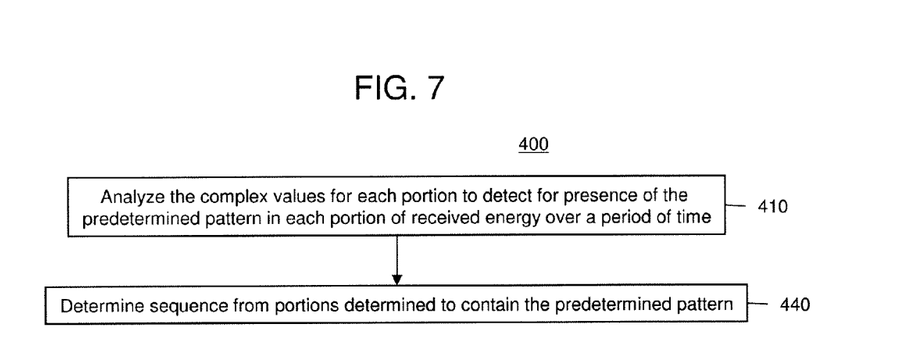
FIG. 7 is a flow chart depicting process logic for determining the sequence from the intermediate domain signal as part of the intermediate domain detection and synchronization process logic.

Turning now to FIG. 7, the analyzing function 400 generally depicted in FIG. 4 is now described in somewhat more detail. In particular, at function 410, the complex values produced at function 330 are analyzed to detect for the presence of a known predetermined pattern (e.g., preamble pattern) in each portion. Then, at function 440, the specific preamble PN sequence for the received energy is determined from the portions that are determined to contain the predetermined pattern. Function 440 involves analyzing data representing the portions of the received energy in which the predetermined pattern is present with respect to all possible PN sequences associated with the predetermined pattern (known to a client device) in order to detect the sequence for the predetermined pattern present in the received energy. The interaction of functions 410, 440 and 300 will become more apparent hereinafter.

If the received signal actually contains a preamble or other sequence with the specific frequency domain structure as discussed above, $q(.)$ the output of the R-size FFT modules in FIG. 6 have specific properties. For example, if k=0 for the preamble sequences shown in FIG. 2, all the inputs to each of R-size FFT module in FIG. 6 are the same which causes all the outputs of each FFT module to be zero except one of them.

This is due to FFT properties in which a signal whose elements are equal create an impulse-like output, i.e., it is zero except for at one element.

Figure 8:
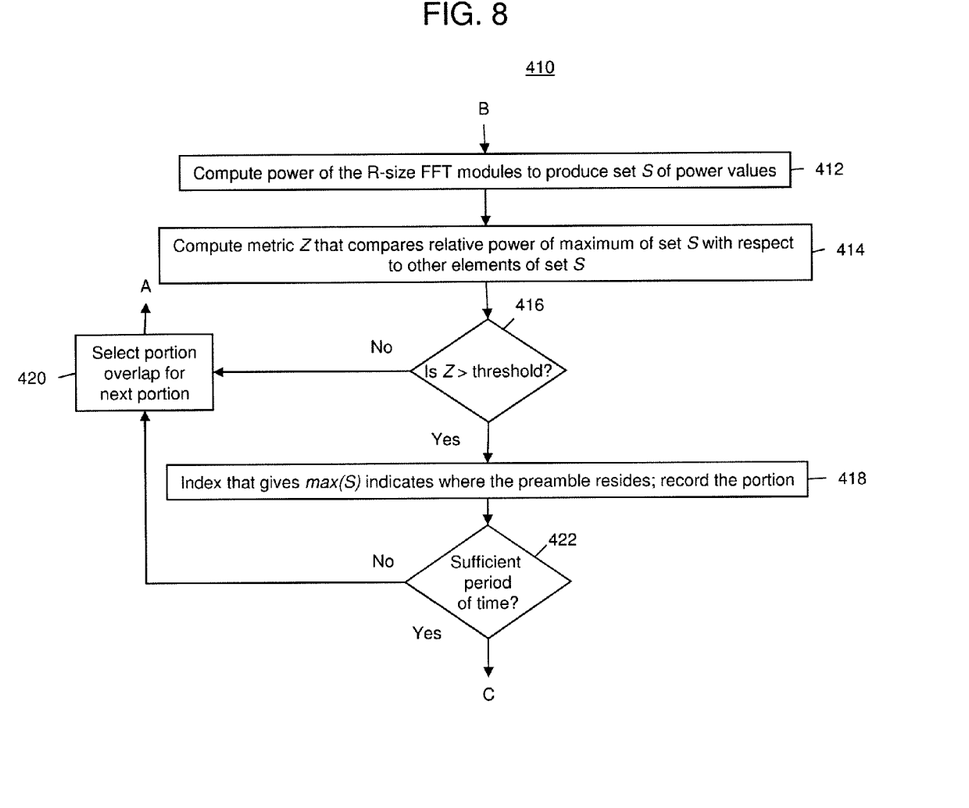
FIG. 8 is a flow chart illustrating process logic detecting presence of a predetermined pattern in the intermediate domain signal as part of the intermediate domain detection and synchronization process logic.

Turning now to FIG. 8, the function 410 is described in more detail. At 412, a sum power of corresponding $k^{th}$ complex values output by the corresponding ones of the plurality of FFT modules is computed to produce a set S of sum power value elements. That is, the sum power of the first outputs of all the FFT modules 332(1)-332(R) are computed, i.e., $$\sum_{k=0}^{R-1} |q(kR)|^2,$$

the sum power of the second outputs of all the FFT modules 332(1)-332(R) is computed, i.e., $$\sum_{k=0}^{R-1} |q(kR+1)|^2,$$

the sum power of the third output of all FFT modules 332(1)-332(R) is computed, i.e., $$\sum_{k=0}^{R-1} |q(kR+2)|^2,$$

and so on.

In equation form using the notation of FIG. 6, the following set S is obtained:

$$S = \left\{ \begin{array}{c} \sum_{k=0}^{F/R-1} |q(kR)|^2, \sum_{k=0}^{F/R-1} |q(kR+1)|^2, \ldots \\ \sum_{k=0}^{F/R-1} |q(lR+1)|^2, \ldots \sum_{k=0}^{F/R-1} |q(lR+k)|^2 \end{array} \right\},$$

which indicates that the complex value of the $l^{th}$ output of all the FFT modules 332(1)-332(R) are added together to form the $l^{th}$ element of S. In short form this can be written as:

$$S = \left\{ \sum_{k=0}^{F/R-1} |q(lR+k)|^2 \text{ for } l = 0, \ldots, R-1 \right\} \quad (1)$$

If the preamble exists within the processed signal, then one of the elements in the set S would have much higher power compared to the rest. In fact, in a noiseless condition, when preamble exists in the processed signal, all elements in the set S are zero except one, making the relative difference between the maximum element and the other elements significant. Moreover, if $l^{th}$ element gives the maximum of S, it indicates that the preamble resides at the indices M+l, M+R+l, M+2R+l, . . . , M+kR+l, and so on.

At 414, a metric of relative power of the elements in S is computed. This metric is denoted Z. First, the maximum sum power element in the set S is determined, and this element is denoted max(S). Once the maximum sum power element is known, there are many ways to compare it with the other elements in the set to see if it is significantly different from the other elements in the set to signify detection of the predetermined pattern in the portion. One way to compute the metric Z as 10 log max(S)−10 log min(S), another is to compute it as 10 log max(S)−10 log mean(S), and still another is to compute it as 10 log max(S)−10 log(mean(S)−max(S)/R). Regardless of the computation chosen, the metric Z represents the relative power of the respective elements in the set S.

At 416, the metric Z is compared to a threshold and when it exceeds this threshold or satisfies some other criterion, then at 418, it is declared that the current portion of the received energy that is being processed contains the predetermined pattern. The data for portions whose metric Z meets the threshold or satisfies a predetermined criterion is stored or recorded for further processing as described hereinafter. Again, the index of max(S) in the set S points to where the predetermined pattern resides. For example, when the $l^{th}$ element of the set S is the maximum element, then the detected preamble resides in M+l, M+R+l, M+2R+l, . . . , M+kR+l. The threshold selected may depend on F, R and the signal-to-noise ratio.

When at 416, it is determined that the metric Z is less than the threshold or otherwise does not satisfy a predetermined criterion, the preamble does not exist in the processed portion. Thus, at 420, a next portion is selected for processing together with zero or more overlap with the currently processed portion, and the function 300 is repeated for this next portion. The overlap chosen for the next portion may be chosen to have an arbitrary amount in common with the previous portion. In general, the shift used to select the next portion, denoted by W, may be a percentage of the FFT size F. For example, for F=512, W=64. The value of W also determines the resolution of coarse time offset detection. For more precise timing, a given portion can be given greater focus by reducing the value of W and repeating the functions 310, 320, 330 and 412-418 to determine more precise timing offset of the received energy. That is, a timing offset with respect to a predetermined pattern in the received energy may be determined by performing the partitioning function 320, processing function 330, power computation function 412, metric computation function 414, and pattern presence detection function 418 repeatedly for portions generated with progressively smaller time shift values.

Data is stored or recorded at 418 for a plurality of portions after numerous passes through functions 310, 320, 330 and 412-418 until at 422, it is determined that a sufficient time period of the received energy has been processed so that the next major stage in the processing logic 100 can be performed for those portions.

Figure 9:
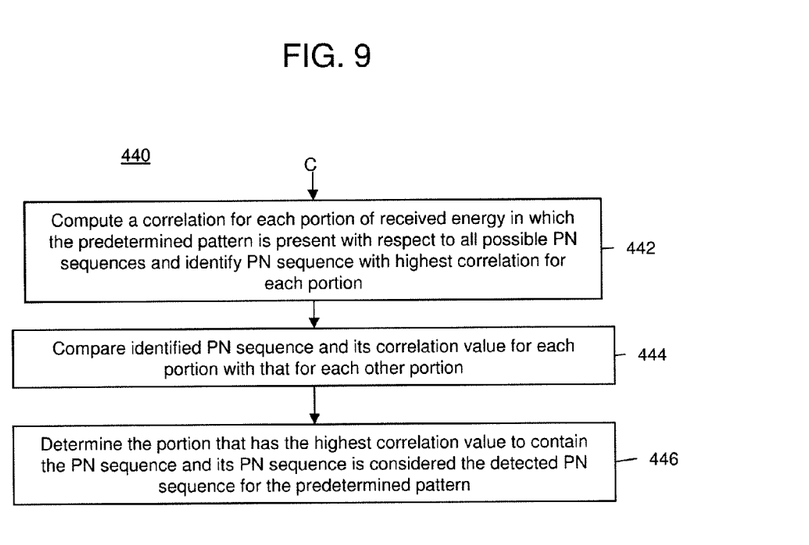
FIG. 9 is a flow chart illustrating in more detail process logic for determining the sequence from the intermediate domain signal as part of the intermediate domain detection and synchronization process logic.

Each recorded portion that is determined to contain the predetermined pattern is further processed by function 440 to determine which PN sequence it carries. Reference is now made to FIG. 9 for a description of function 440. Again, function 440 involves analyzing data representing the portions of received energy in which the predetermined pattern is likely to be present with respect to all possible PN sequences (set of possible sequences) associated with the predetermined pattern in order to determine the PN sequence for the predetermined pattern present in the received energy. This is performed by taking correlation of the selected portion with all the PN sequences (where the index for the maximum of S is taken into consideration). The comparison and correlation are taken either in the intermediate domain or in the frequency domain.

Thus, at 442, a correlation is computed for each portion of received energy in which the predetermined pattern is present with respect to all possible preamble PN sequences (from function 418 in FIG. 8 above) and for each portion, the PN sequence that has the highest correlation is identified. The correlations may be computed in the intermediate domain and/or frequency domain. At 444, the identified PN sequence and its corresponding correlation value for each portion is compared with the identified PN sequence and corresponding correlation value for each of the other portions. The comparisons among PN sequences and correlation values may be made in the frequency domain and/or intermediate domain. At 446, the PN sequence for the portion that has the largest correlation among that computed for all of the portions is determined to be the detected PN sequence for the predetermined pattern determined to be present in the received energy. That is, the portion that has the highest correlation value is determined to contain the PN sequence and its PN sequence is considered to be the detected PN sequence.

In the description of the foregoing functions, it is assumed that the frequency offset between the receiving device, e.g. client device, and the received signal is within a tolerable range, e.g., half inter-carrier frequency of the OFDM/OFDMA system. However, it is possible that a larger frequency offset exists. In this situation, the client device can perform a search to determine the frequency offset and detect the preamble simultaneously.

Figure 10:
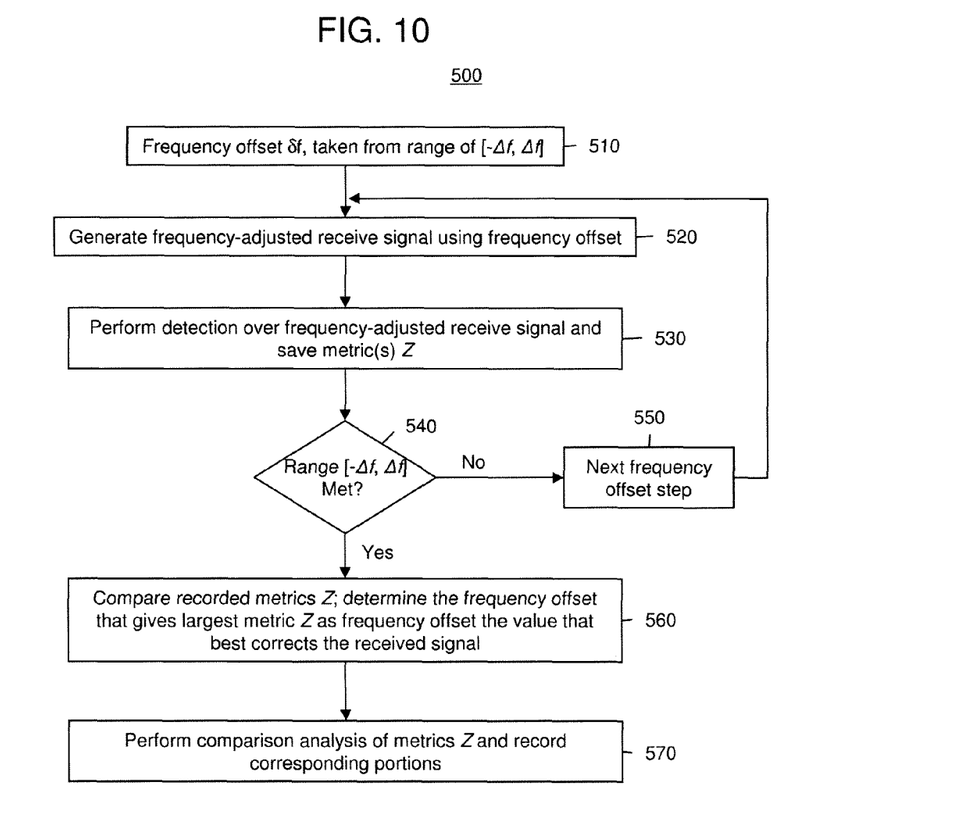
FIG. 10 is a flow chart illustrating process logic for detecting the presence of a pattern across multiple frequency adjusted receive signals using multiple frequency offsets.

FIG. 10 illustrates a flow chart for a process 500 that involves a generalization of the detection analysis of function 410 to also detect frequency offset associated with respect to the received signal. The process 500 operations essentially as follows. Frequency-adjusted received energy is generated for each of a plurality of frequency offsets. At 510, a range [$-\Delta f$, $\Delta f$] of frequency offsets to be analyzed is determined, together with a frequency offset step $\delta f$, based on design tradeoffs and other factors, such as one inter-carrier frequency of the OFDM/OFDMA system. Thus, at 520, a frequency-adjusted receive signal is generated using the assumed frequency offset from the above-mentioned range. The preamble detection function (involving the partitioning function 320, processing function 330, power computation function 412, and metric computation function 414) is performed for the frequency-adjusted signal and the metrics Z computed are saved at 530. As indicated at 540 and 550, the loop involving functions 520 and 530 is repeated to cover the entire desired range [$-\Delta f$, $\Delta f$] in frequency offset steps $\delta f$. At 560, the metrics computed for each of the frequency adjusted received signals are compared and the frequency offset that best corrects the received energy is determined from the frequency offset value whose metrics are the largest. At 570, the comparison analysis of the metrics determined for the best frequency offset determined at 560 are then recorded and used for further processing for PN sequence determination.

Figure 11:
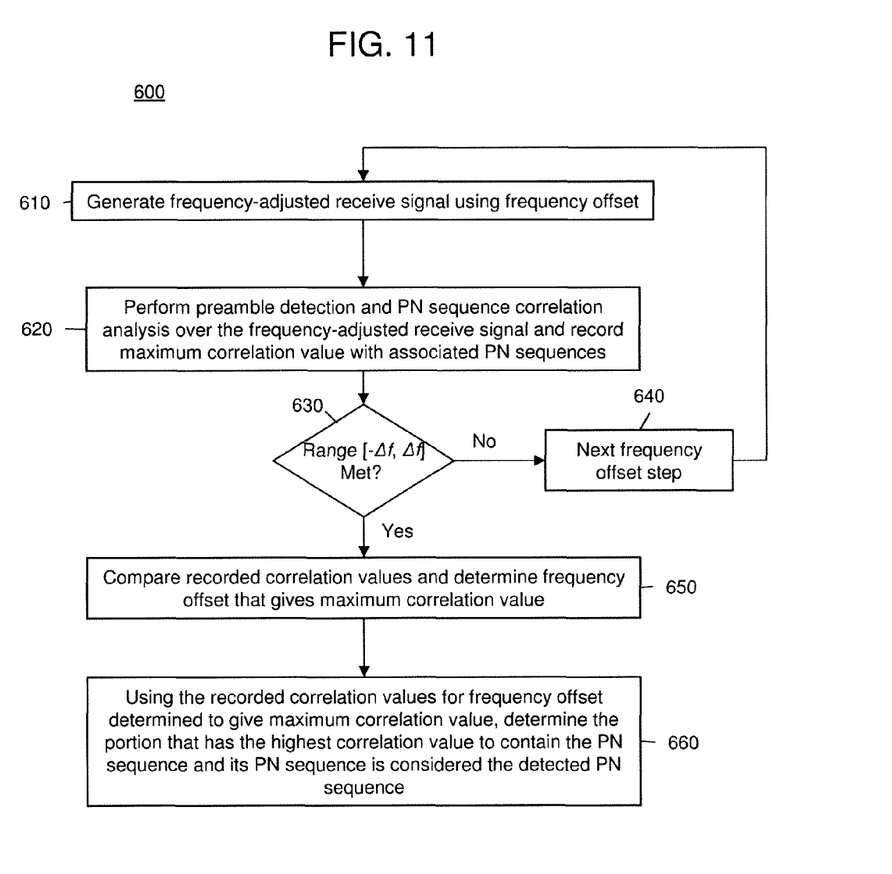
FIG. 11 is a flow chart illustrating process logic for determining the sequence across multiple frequency adjusted receive signals using multiple frequency offsets.

Similarly, FIG. 11 illustrates a flow chart for a process 600 that is configured to determine the frequency offset in the context of detecting the PN sequence. This process 600 involves computing frequency adjusted received energy using a plurality of frequency offsets, comparing correlation values computed for each frequency adjusted received energy and determining the frequency offset that best corrects the received energy from the frequency offset value whose correlation values are the largest. At 610, a frequency-adjusted receive signal is generated using the current frequency offset. At 620, the preamble detection function (involving the partitioning function 320, processing function 330, power computation function 412, and metric computation function 414) as well as the PN sequence correlation analysis (which is essentially the same as the function 440 in FIG. 9) is performed over the frequency-adjusted receive signal and the maximum correlation values associated with the PN sequences are recorded. As indicated by functions 630 and 640, the functions 610 and 620 are repeated for each of a plurality of frequency offset steps until the entire frequency offset range has been met. Then at 650, the recorded correlation values are compared and a determination is made as to which frequency offset yielded the maximum correlation values. At 660, using the recorded correlation values for the frequency offset determined to give the maximum correlation values, the portion that has the largest correlation value is determined to contain the PN sequence and its PN sequence is considered the detected PN sequence for the preamble.

The sequence synchronization and detection techniques described herein are efficient and adaptive since the processing from the time domain to the intermediate domain is inherently a part of the transform processing (e.g., FFT processing) to transform a time domain sequence to a frequency domain sequence. The intermediate domain sequence is processed to produce a set of candidates for the location of the sequence without the full transformation to the frequency domain. By setting a threshold, the most reliable candidate can be obtained. Higher reliability sequence synchronization can be achieved by fully transforming a subset of previously-obtained candidates to the frequency domain and perform further processing, while still achieving significant savings in processing resources.

Although the apparatus, logic, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, logic, and method, as set forth in the following claims.

What is claimed is:

1. A method comprising:
receiving at a wireless communication device energy in a frequency band and generating data representing samples of a received time domain waveform from the received energy;
processing data for groups of samples of the received time domain waveform to transform the data representing the samples of the received time domain waveform to data for an intermediate domain signal that is in neither the time domain nor the frequency domain, wherein processing comprises, for portions of the energy received over a time period, partitioning the samples of the received time domain waveform into R plurality of groups, each group comprising a plurality of ordered samples, wherein R is a repetition frequency of a predetermined pattern, wherein the processing comprises processing i'th ordered samples from each of the plurality of R groups with a corresponding one of R transform modules each of size R such that each transform module outputs R complex values which across the plurality of transform modules make up the intermediate domain signal, where i is an index for ordered samples in each of the R plurality of groups; and
analyzing the data representing the intermediate domain signal to determine whether a sequence having the predetermined pattern from a set of possible sequences is present in the received energy.

2. The method of claim 1, wherein analyzing comprises analyzing complex values for each portion to detect presence of the predetermined pattern, and for the portions determined to contain the predetermined pattern, determining a pseudo-random sequence of the predetermined pattern.

3. The method of claim 2, wherein analyzing the portions comprises computing a sum power that is a sum of powers of k'th complex values output by each of the plurality of R transform modules to produce a set of sum power value elements that includes a sum power value element for each k'th complex value, where k is an index for complex values output by each of the plurality of R transform modules, determining a maximum sum power element in the set, computing a metric that compares the maximum sum power value element in the set with respect to other sum power value elements in the set, and declaring that the predetermined pattern is likely to be present in the current portion of the received energy when the metric exceeds a threshold.

4. The method of claim 3, and further comprising generating data for a next portion such that it partially overlaps in time with a current portion.

5. The method of claim 4, wherein generating data for the next portion comprises computing a time shift of the received energy from the current portion to the next portion, wherein the time shift determines the partial overlap of the next portion with the current portion.

6. The method of claim 5, and further comprising detecting a timing offset with respect to the predetermined pattern in the received energy by performing said partitioning, processing, computing the sum power, determining, computing the metric and declaring repeatedly for portions with progressively smaller time shift values.

7. The method of claim 3, and further comprising storing data representing the portions of received energy in which the predetermined pattern is determined to likely be present based on the metrics computed for the respective portions.

8. The method of claim 7, and further comprising analyzing data representing the portions of received energy in which the predetermined pattern is likely to be present with respect to all possible pseudo-noise sequences in the set of sequences in order to determine a pseudo-noise sequence for the predetermined pattern present in the received energy.

9. The method of claim 8, wherein analyzing the data representing the portions of received energy comprises computing a correlation for each portion of received energy in which the predetermined pattern is likely to be present with respect to all possible preamble pseudo-noise sequences, identifying for each portion the pseudo-noise sequence that has the highest correlation, and comparing the identified pseudo-noise sequence and its corresponding correlation for the plurality of portions of received energy in which the predetermined pattern is likely to be present and designating the pseudo-noise sequence for the portion that has the largest correlation among that computed for all of the portions to be a detected pseudo-noise sequence present in the received energy.

10. The method of claim 9, and further comprising computing frequency adjusted received energy using a plurality of frequency offsets, comparing correlation values computed for each frequency adjusted received energy and determining the frequency offset that best corrects the received energy from the frequency offset value whose correlation values are the largest.

11. The method of claim 3, and further comprising computing frequency adjusted received energy using a plurality of frequency offsets, and performing said partitioning, processing, computing the sum power, determining and computing the metric with respect to frequency adjusted received energy at each of the plurality of frequency offsets, comparing the metrics computed for each of the frequency adjusted received energy and determining the frequency offset that best corrects the received energy from the frequency offset value whose metrics are the largest.

12. The method of claim 1, and further comprising transforming a subset of the portions to the frequency domain and analyzing those portions in the frequency domain to determine presence of the predetermined pattern.

13. The method of claim 1, wherein processing comprises performing, by a plurality of Fast Fourier Transform (FFT) processors, FFT processing of data for a plurality of different groups of samples of the received time domain waveform to produce the data for the intermediate domain signal.

14. An apparatus comprising:
a receiver that is configured to receive energy in a frequency band and to generate data representing samples of a received time domain waveform from the received energy;
a controller that is configured to:
process data for groups of samples of the received time domain waveform to transform the data representing samples of the received time domain waveform to data for an intermediate domain signal that is in neither the time domain nor the frequency domain, wherein for portions of the energy received over a time period, the samples of the received time domain waveform are partitioned into R plurality of groups, each group comprising a plurality of ordered samples, wherein R is a repetition frequency of a predetermined pattern, wherein the controller is configured to process i'th ordered samples from each of the plurality of R groups with a corresponding one of R transform modules each of size R such that each transform module outputs R complex values which across the plurality of transform modules make up the intermediate domain signal, where i is an index for ordered samples in each of the R plurality of groups; and
analyzing the intermediate domain signal to determine whether a sequence having the predetermined pattern from a set of possible sequences is present in the received energy.

15. The apparatus of claim 14, wherein the controller is configured to analyze the complex values for each portion to detect presence of the predetermined pattern, and for the portions determined to contain the predetermined pattern, to determine a pseudo-random sequence of the predetermined pattern.

16. The apparatus of claim 15, wherein the controller is configured to analyze the complex values so as to compute a sum power that is a sum of powers of k'th complex values output by each of the plurality of R transform modules to produce a set of sum power value elements that includes a sum power value element for each k'th complex value, where k is an index for complex values output by each of the plurality of R transform modules, determine a maximum sum power element in the set, compute a metric that compares the maximum sum power value element in the set with respect to other sum power value elements in the set, declare that the predetermined pattern is present in the current portion of the received energy when the metric exceeds a threshold, and store data representing the portions of the received energy in which the predetermined pattern is determined to be present based on the metrics computed for the respective portions.

17. The apparatus of claim 16, wherein the controller is configured to analyze data representing the portions of received energy in which the predetermined pattern is likely to be present with respect to all possible pseudo-noise sequences in the set of sequences in order to determine a pseudo-noise sequence for the predetermined pattern present in the received energy.

18. The apparatus of claim 14, wherein the controller is configured to Fast Fourier Transform (FFT) process data for a plurality of different groups of samples of the received time domain waveform to produce the data for the intermediate domain signal.

19. Logic encoded in one or more non-transitory media for execution and when executed operable to:
transform data representing groups of samples of a received time domain waveform from energy received at a wireless communication device in a frequency band to data for an intermediate domain signal that is in neither the time domain nor the frequency domain, wherein for portions of the energy received over a time period, the samples of the received time domain waveform are partitioned into R plurality of groups, each group comprising a plurality of ordered samples, wherein R is a repetition frequency of a predetermined pattern, wherein the logic that transforms comprises logic to process i'th ordered samples from each of the plurality of R groups with a corresponding one of R transform modules each of size R such that each transform module outputs R complex values which across the plurality of transform modules make up the intermediate domain signal, where i is an index for ordered samples in each of the R plurality of groups; and analyze the data representing the intermediate domain signal to determine whether a sequence having the predetermined pattern from a set of possible sequences is present in the received energy.

20. The logic of claim 19, wherein the logic that analyzes comprises logic that is configured to analyze complex values for each portion to detect presence of the predetermined pattern, and logic that is configured to determine a pseudo-random sequence of the predetermined pattern for the portions determined to contain the predetermined pattern.

21. The logic of claim 20, wherein the logic that analyzes comprises logic that is configured to compute a sum power that is a sum of powers of k'th complex values output by each of the plurality of R transform modules to produce a set of sum power value elements that includes a sum power value element for each k'th complex value, where k is an index for complex values output by each of the plurality of R transform modules, determine a maximum sum power element in the set, compute a metric that compares the maximum sum power value element in the set with respect to other sum power value elements in the set, declare that the predetermined pattern is present in the current portion of the received energy when the metric exceeds a threshold, and store data representing the portions of the received energy in which the predetermined pattern is determined to be present based on the metrics computed for the respective portions.

22. The logic of claim 21, wherein the logic that analyzes comprises logic configured to analyze data representing the portions of received energy in which the predetermined pattern is likely to be present with respect to all possible pseudo-noise sequences in the set of sequences in order to determine a pseudo-noise sequence for the predetermined pattern present in the received energy.

23. The logic of claim 19, wherein the logic that processes data for groups of samples of the received time domain waveform comprises logic that Fast Fourier Transform (FFT) processes data for a plurality of different groups of samples of the received time domain waveform to produce the data for the intermediate domain signal.

* * * * *